(12) United States Patent
Kato

(10) Patent No.: US 12,333,617 B2
(45) Date of Patent: Jun. 17, 2025

(54) DEVICE, METHOD, AND COMPUTER-READABLE MEDIUM FOR MANAGING PLURALITY OF PIECES OF DRAWING DATA REPRESENTING SET OF COMPONENTS

(71) Applicant: CADDi, Inc., Tokyo (JP)

(72) Inventor: Yushiro Kato, Tokyo (JP)

(73) Assignee: CADDi, Inc., Tokyo (JP)

( * ) Notice: Subject to any disclaimer, the term of this patent is extended or adjusted under 35 U.S.C. 154(b) by 0 days.

(21) Appl. No.: 18/755,510

(22) Filed: Jun. 26, 2024

(65) Prior Publication Data
US 2024/0346607 A1    Oct. 17, 2024

Related U.S. Application Data

(63) Continuation of application No. PCT/JP2022/048677, filed on Dec. 28, 2022.

(30) Foreign Application Priority Data

Dec. 29, 2021 (JP) .................................. 2021-215458
Jun. 21, 2022 (JP) .................................. 2022-099951

(51) Int. Cl.
*G06Q 50/04* (2012.01)
*G06Q 10/0631* (2023.01)
(Continued)

(52) U.S. Cl.
CPC ......... *G06Q 50/04* (2013.01); *G06Q 10/0631* (2013.01); *G06V 30/18019* (2022.01); *G06V 30/30* (2022.01); *G06V 30/418* (2022.01)

(58) Field of Classification Search
CPC .............. G06Q 50/04; G06Q 10/0631; G06V 30/18019; G06V 30/30; G06V 30/418
See application file for complete search history.

(56) References Cited

U.S. PATENT DOCUMENTS

| 6,289,254 B1 * | 9/2001 | Shimizu | G06F 30/00 |
| | | | 700/182 |
| 2007/0206884 A1 * | 9/2007 | Kato | G06V 30/262 |
| | | | 382/229 |
| 2019/0325091 A1 * | 10/2019 | Kawamoto | G06F 30/10 |

FOREIGN PATENT DOCUMENTS

| CN | 114187129 A | * | 3/2022 |
| JP | 2018-116454 A | | 7/2018 |
| JP | 2021157510 A | * | 10/2021 |

OTHER PUBLICATIONS

International Search Report received in PCT Application No. PCT/JP2022/048677, dated Mar. 14, 2023.
(Continued)

*Primary Examiner* — Pinalben Patel
(74) *Attorney, Agent, or Firm* — Rimon P.C.

(57) ABSTRACT

A method of operation of a computer for managing a plurality of pieces of drawing data representing a set of components, includes: determining whether target drawing data included in the plurality of pieces of drawing data is related to existing drawing data that has been already stored; acquiring record information when the record information associated with the existing drawing data is stored in a case in which a result of the determining is affirmative; and transmitting record display information for displaying the record information to a terminal. The determining includes determining whether the existing drawing data represents a component having an attribute identical with an attribute of a component represented by the target drawing data. The attribute represents a material, a surface treatment, a processing method, or a combination of two or more of them.

8 Claims, 4 Drawing Sheets

(51) Int. Cl.
    *G06V 30/18*     (2022.01)
    *G06V 30/30*     (2022.01)
    *G06V 30/418*     (2022.01)

(56) References Cited

OTHER PUBLICATIONS

Akabori, Hideaki, Focus on the News, "A digital matching platform (design / procurement DX) which utilized NTT Com and PwC consulting, digital design data and AI is developed" NTT Gijutsu Journal, Aug. 1, 2020, vol. 32 No. 8, pp. 69-71.
Decision to Grant a Patent received in Japanese Patent Application No. 2022-099951, dated Dec. 8, 2023.

\* cited by examiner

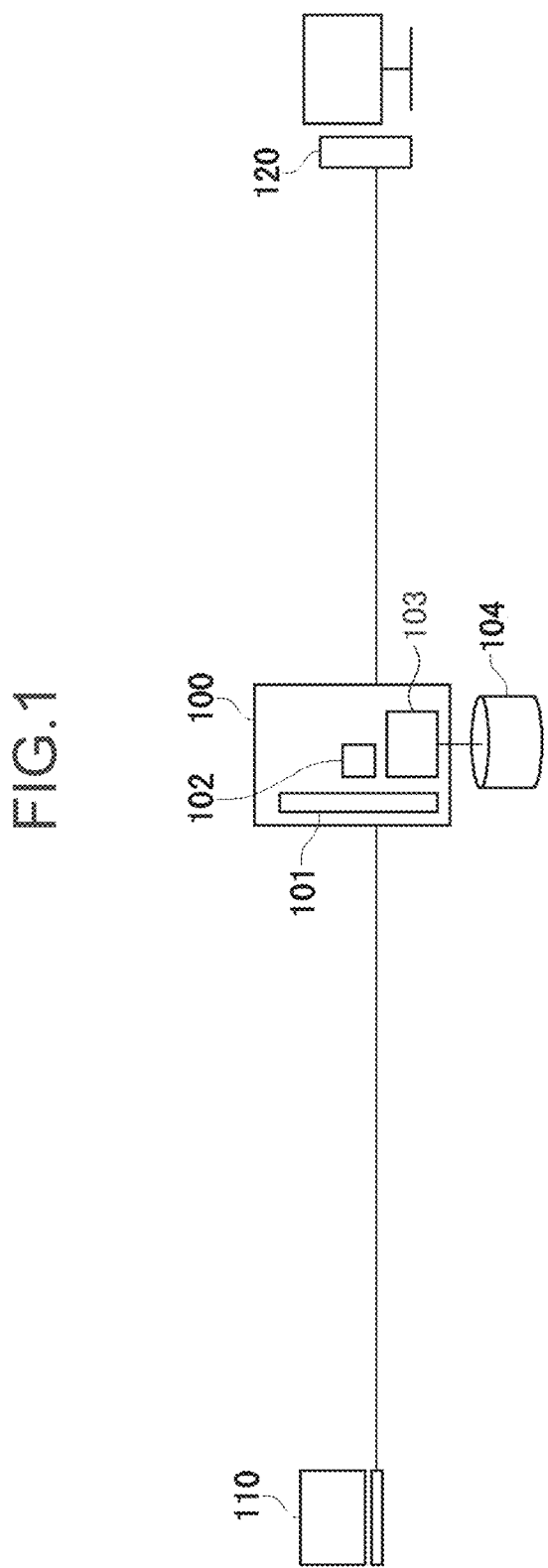

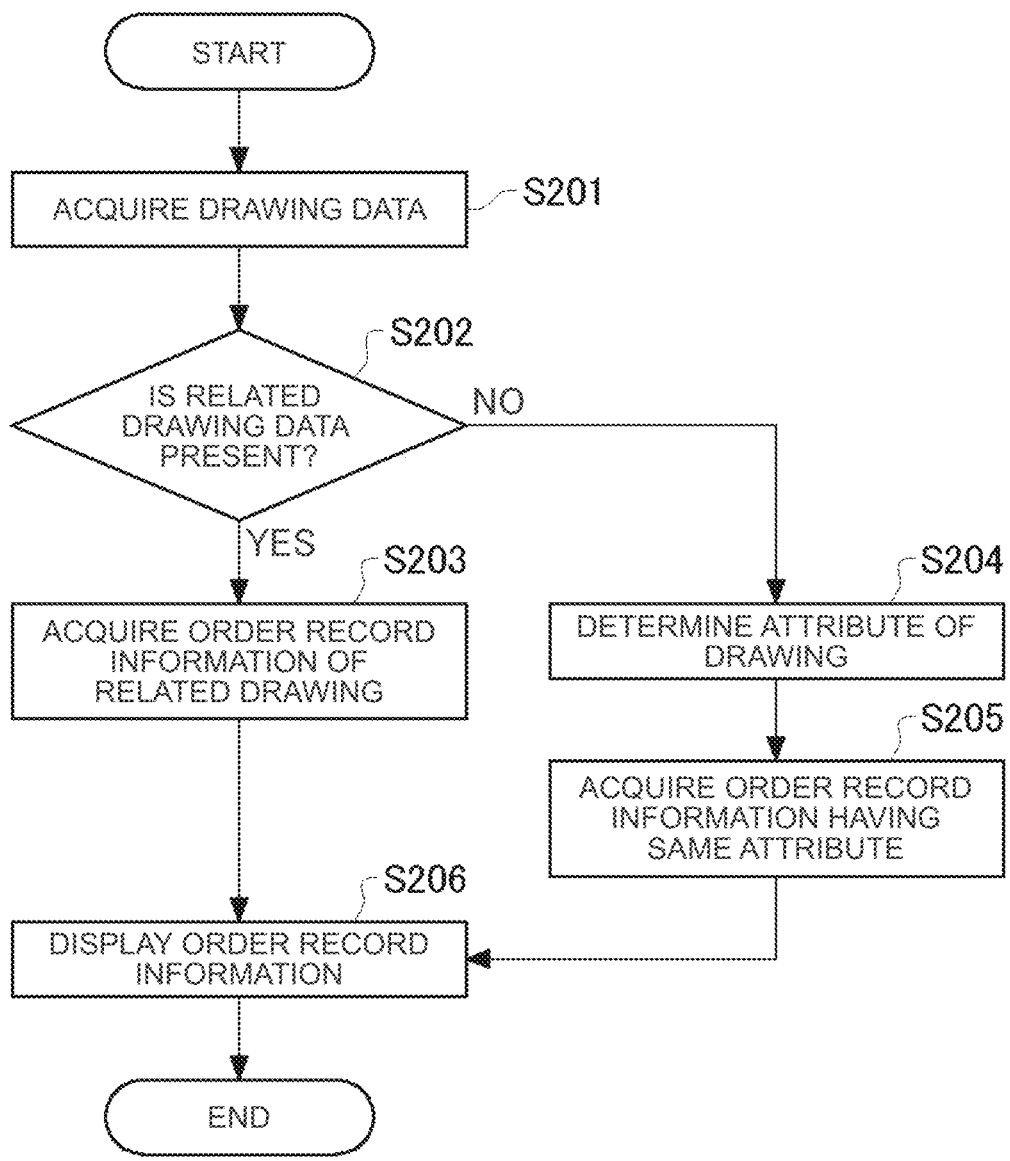

FIG.3

NUMBER OF PRODUCTS : 24

ORDER RECORD IS PRESENT:22 | SIMILARITY IS PRESENT:2 | SIMILARITY IS NOT PRESENT:2

ORDER RECORD IS PRESENT

| SERIAL NUMBER | 55000 |
| FIGURE NUMBER | 67-1-42 |
| COMPONENT NAME | MOTOR COVER |
| MATERIAL | SPCC |
| SURFACE TREATMENT | BLACKENING |

ORDER RECORD

| ORDERING DESTINATION | KATO INDUSTRY CO., LTD |
| UNIT PRICE OF ORDER | ¥20,000 |
| LOT | 1 |
| ORDERING DATE | 2021/04/01 |

SIMILARITY IS PRESENT

| SERIAL NUMBER | 55000 |
| FIGURE NUMBER | 67-1-23 |
| COMPONENT NAME | TABLE BRACKET |
| MATERIAL | SS400D |
| SURFACE TREATMENT | BLACKENING |

SIMILARITY 1

| SERIAL NUMBER | 55000 |
| FIGURE NUMBER | 67-1-23 |
| COMPONENT NAME | TABLE BRACKET |
| MATERIAL | SS400D |
| SURFACE TREATMENT | BLACKENING |

| ORDERING DESTINATION | YUKAWA TECH CO., LTD |
| UNIT PRICE OF ORDER | ¥8,200 |
| LOT | 3 |
| ORDERING DATE | 2021/05/06 |

SIMILARITY IS NOT PRESENT

| SERIAL NUMBER | 55000 |
| FIGURE NUMBER | 67-1-22 |
| COMPONENT NAME | STAND MOUNTING STAY |
| MATERIAL | S45CH |
| SURFACE TREATMENT | BLACKENING |

HIGH RANKING OF ORDER RECORD IN CATEGORY OF IRON × SHEET METAL × BLACKENING

1. KOBASHI TEKKO CO., LTD
2. KUMANA KOGYO CO., LTD
3. KATO INDUSTRY CO., LTD

300

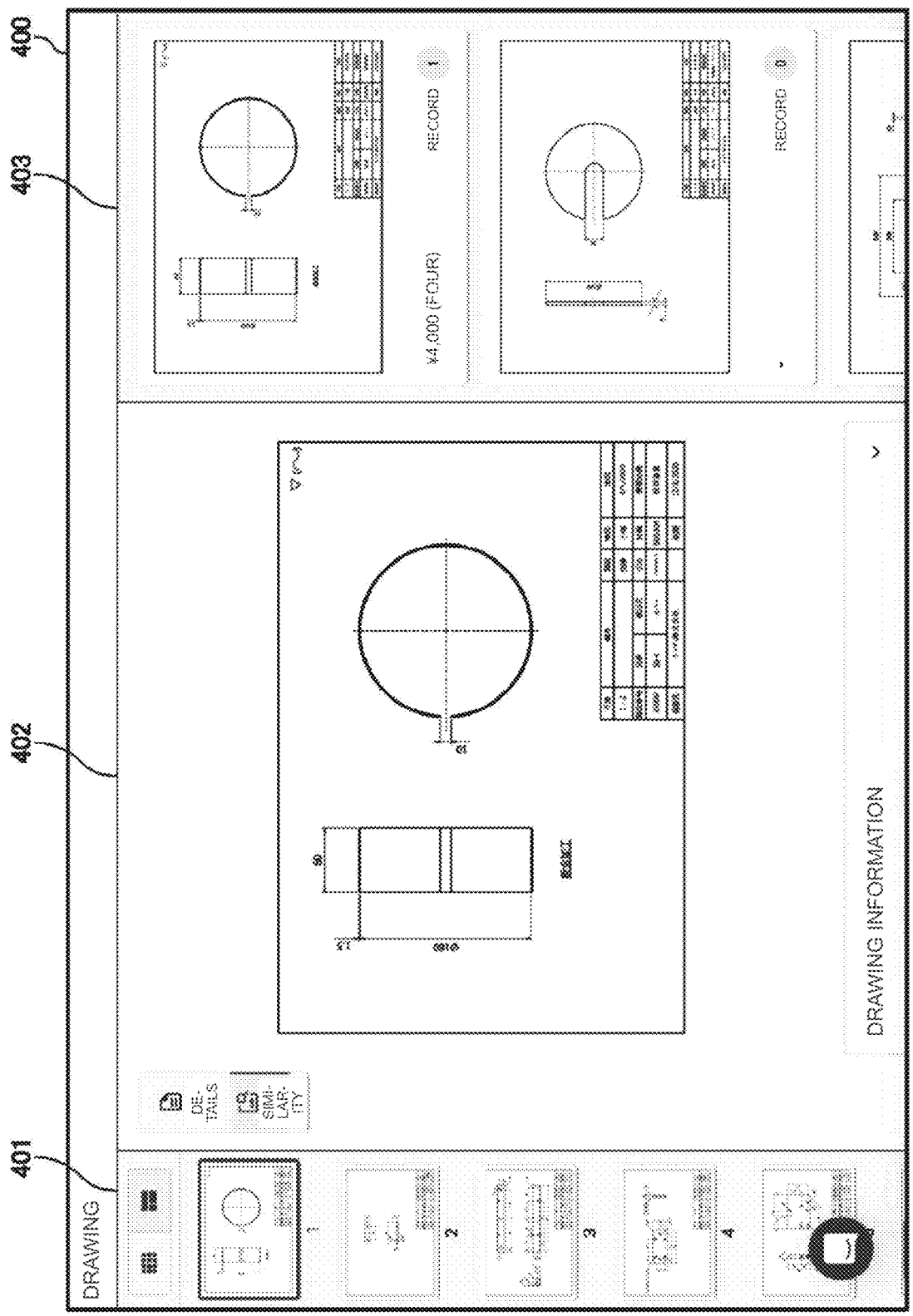

DEVICE, METHOD, AND COMPUTER-READABLE MEDIUM FOR MANAGING PLURALITY OF PIECES OF DRAWING DATA REPRESENTING SET OF COMPONENTS

CROSS-REFERENCE TO RELATED APPLICATIONS

This application is a continuation of PCT International Application No. PCT/JP2022/048677 filed on Dec. 28, 2022 which claims the benefit of priority from Japanese Patent Application No. 2021-215458 filed on Dec. 29, 2021 and Japanese Patent Application No. 2022-099951 filed on Jun. 21, 2022, the entire contents of which are incorporated herein by reference.

FIELD

The present invention relates to a method for managing a plurality of pieces of drawing data representing a set of components.

BACKGROUND

As one automobile includes about 30000 components, various components are required in manufacturing industry. Typically, manufacturers do not process all of such various kinds of components by own company, but outsources manufacturing to outside fabricators.

In outsourcing manufacturing, a manufacturer provides a component drawing representing a component to be outsourced to a fabricator as an electronic medium or a paper medium printed from the electronic medium for an estimate, ordering, and the like, and the electronic medium is managed mainly as data in PDF format.

In the manufacturer, a purchasing agent in charge of work such as estimation and ordering manages drawing data as image data in PDF format as described above. However, for example, an inexperienced purchasing agent cannot determine to outsource manufacturing to which fabricator based on the drawing data. In many cases, the number of components required for a certain product is several tens or more, several hundreds or more, or furthermore, several thousands or more, so that it is not easy to select an appropriate outsourcing contractor for each of the components.

The present invention has been made in view of such a situation, and has an object to suppor outsourcing of manufacturing of a component represented by each piece of drawing data included in a set of pieces of the drawing data by a device, a method, and a computer program product for managing a plurality of pieces of the drawing data representing a set of components.

The drawing data in PDF format has been described above by way of example. However, more typically, the same problem exists in drawing data including raster data, and examples of a data format include JPG format, TIFF format, and the like. Herein, the "raster data" is data including a plurality of pixels. Drawing data in JPG format or TIFF format typically includes only raster data, but drawing data in PDF format may include vector data or text data in addition to the raster data in some cases. Drawing data in PDF format does not include any layer in many cases, but may include a plurality of layers.

The purchasing agent may manage the drawing data as Computer Aided Design (CAD) data represented by DXF format, and the same problem may exist in a case in which at least part of a plurality of pieces of drawing data representing a set of components is CAD data. Herein, the "CAD data" means drawing data that can be edited by CAD software, and includes vector data. The "vector data" is data including a plurality of points and one or more line segments or arcs connecting at least two of the points.

In the above description, supporting outsourcing of manufacturing by a manufacturer is described as an object of the present invention, but the present invention can be applied with an object to support a contract for manufacturing accepted by a fabricator as described later.

SUMMARY

In order to achieve such an object, an aspect of the present invention is a method of operation of a computer for managing a plurality of pieces of drawing data representing a set of components. The method includes: determining whether target drawing data included in the plurality of pieces of drawing data is related to existing drawing data that has been already stored; acquiring record information when the record information associated with the existing drawing data is stored in a case in which a result of the determining is affirmative; and transmitting record display information for displaying the record information to a terminal. The determining includes determining whether the existing drawing data represents a component having an attribute identical with an attribute of a component represented by the target drawing data. The attribute represents a material, surface treatment, a processing method, or a combination of two or more of them.

BRIEF DESCRIPTION OF THE DRAWINGS

FIG. 1 is a diagram illustrating a device for managing a plurality of pieces of drawing data according to a first embodiment of the present invention;

FIG. 2 is a diagram illustrating a procedure of a method for managing a plurality of pieces of drawing data according to the first embodiment of the present invention;

FIG. 3 is a diagram illustrating an example of order record information according to the first embodiment of the present invention; and FIG. 4 is a diagram illustrating another example of order record information according to the first embodiment of the present invention.

DETAILED DESCRIPTION

The following describes embodiments of the present invention in detail with reference to the drawings.

First Embodiment

FIG. 1 illustrates a device for managing a plurality of pieces of drawing data according to a first embodiment of the present invention. A device 100 communicates with a manufacturer terminal 110 used by a manufacturer via an IP network such as the Internet, and enables a plurality of pieces of drawing data to be managed. The device 100 can similarly communicate with a fabricator terminal 120 used by a fabricator, and can also provide a drawing management service for the fabricator. The present embodiment describes an example of a drawing management service for the manufacturer.

The device 100 includes a communication unit 101 such as a communication interface, a processing unit 102 such as a processor and a CPU, and a storage unit 103 including a storage medium or a storage device such as a memory and a hard disk, and can be configured by executing computer programs for performing respective pieces of processing. The device 100 may include one or more devices, computers, or servers. The computer program may include one or more computer programs, and can be recorded in a computer-readable storage medium to be a non-transitory computer program product. The computer program can be stored in a storage medium or a storage device such as a database 104 that can be accessed via an IP network from the storage unit 103 or the device 100, and executed by the processing unit 102. Data described below as being stored in the storage unit 103 may be stored in the database 104, and vice versa.

First, the device 100 acquires a plurality of pieces of drawing data representing a set of components associated with the manufacturer using the manufacturer terminal 110 (S201). For example, the pieces of drawing data are stored in the storage unit 103 by being uploaded and registered to a Web page provided by the device 100 by a purchasing agent of the manufacturer, and are read out to be acquired. A drawing displayed with the drawing data includes line segments and symbols representing components, and further includes characters representing the components. The characters may include at least one of a serial number, a figure number, and a component name, and may further include at least one of a material and surface treatment. These line segments, symbols, and characters are simply pixel values in drawing data in a raster format, and can be recognized when the viewer views the drawing represented by the drawing data.

Next, the device 100 determines, for the respective pieces of drawing data, presence/absence of drawing data related to existing drawing data that has been already stored (S202). Herein, the related drawing data includes at least one of drawing data matching the existing drawing data that has been already stored and drawing data similar to the existing drawing data that has been already stored. Herein, determination is not necessarily performed for all of the pieces of drawing data included in the pieces of drawing data, and it can be considered that determination is not performed for part of the drawing data.

In determining presence/absence of matching, for example, it can be considered to determine matching is present in a case in which a feature amount is extracted from target drawing data as a determination target, and a difference between the feature amount and a feature amount of any piece of the existing drawing data that has been already stored falls within a first predetermined range. More specifically, the device 100 may vectorize the target drawing data and the existing drawing data as needed, and extract a feature amount from vectorized drawing data. Examples of the feature amount include angle distribution or frequency distribution of a plurality of line segments included in the vectorized drawing data. By way of example, coordinates may be defined assuming that a lateral direction of the drawing is 0°, and it can be considered to use a frequency of a line segment having an angle equal to or larger than −22.5° and smaller than 22.5°, equal to or larger than 22.5° and smaller than 67.5°, equal to or larger than 67.5° and smaller than 112.5°, and equal to or larger than 112.5° and smaller than 167.5°. More preferably, it can be considered to use angle distribution obtained by weighting each line segment with a length thereof. Herein, "vectorization" means to convert data into data including a plurality of points and one or more line segments or arcs connecting at least two of the points.

Regarding presence/absence of similarity, in the same algorithm as an algorithm used for determining presence/absence of matching, it can be considered to determine that similarity is present in a case in which a difference between the feature amount of the target drawing data and a feature amount of any piece of the existing drawing data does not fall within the first predetermined range but falls within a second predetermined range wider than the first predetermined range. Alternatively, an algorithm different from the algorithm used for determining presence/absence of matching may be used.

In a case in which a determination result for the target drawing data is affirmative, that is, in a case in which the target drawing data is data related to the existing drawing data (corresponding to "first existing drawing data"), when there is order record information (corresponding to "first record information") of the component represented by the existing drawing data, the device 100 acquires the order record information (S203). The order record information includes an ordering destination, and may further include at least one of a price, a unit price, the number of lots, and an ordering date. Particularly, in a case in which the target drawing data is similar to the existing drawing data, it is preferable to also acquire that drawing data.

On the other hand, in a case in which there is no existing drawing data related to the target drawing data, the device 100 may determine an attribute of the component represented by the target drawing data (S204), and acquire order record information (corresponding to "second record information") associated with existing drawing data (corresponding to "second existing drawing data") representing a component having the same attribute as the determined attribute (S205).

For example, the attribute determined herein may be a material of the component, surface treatment, a processing method, or a combination of two or more of them. The material can be determined based on characters extracted by performing character recognition on the drawing data. The surface treatment can be determined based on characters or symbols extracted by performing character recognition or symbol recognition on the drawing data. Similarly to the surface treatment, the processing method can also be determined based on characters or symbols extracted by performing character recognition or symbol recognition on the drawing data.

For example, the drawing includes a portion having a cell structure called a title space, and a serial number, a figure number, a component name, a material, surface treatment, and the like are described therein in many cases. Thus, the material can be determined based on characters extracted from the drawing data. If the cell structure of the title space is registered for each user who uses the drawing management service provided by the device 100, the material can be determined based on characters described in a cell representing the material. If the surface treatment and the processing method are described in the title space, they can also be determined based on characters extracted from data for displaying the title space included in the drawing data.

In some cases, the processing method can be determined based on characters representing dimensions of the component instead of characters described in the title space. For example, if there is a description of "t3", this represents a thickness of the component, and the component is determined to be a component manufactured by sheet metal processing among representative processing methods such as sheet metal processing, lathe machining, and milling.

The device 100 then transmits order record display information (corresponding to "record display information") for displaying the acquired order record information to the manufacturer terminal 110 (S206). The order record display information can be transmitted as a file in HTML format, for example, to be information for displaying the order record information on a Web browser on a display screen of the manufacturer terminal 110. Alternatively, an application (hereinafter, also referred to as an "app") installed in the manufacturer terminal 110 may be operated, and the order record display information may be used as information for displaying the order record information on the app.

FIG. 3 illustrates an example of the order record information according to the first embodiment of the present invention. An order record display screen 300 can display 24 drawings representing 24 components (only some of them are displayed in FIG. 3), and presence/absence of related existing drawing data is determined for drawing data representing each of the drawings. In a case in which matching existing drawing data is present and the existing drawing data is stored while being associated with the order record information, a label of "order record is present" is displayed. In a case in which matching existing drawing data is not present, a label of "new drawing" is displayed. The order record display information may include label information for displaying a label corresponding to each of the drawings. Pieces of the order record display information may be transmitted at the same time for all of a plurality of pieces of drawing data representing a set of components, or may be separately transmitted multiple times. The order record display information may include matching or similar existing drawing data.

For the new drawing, presence/absence of similar existing drawing data is further determined. In a case in which similar existing drawing data is present, a label of "similarity is present" is displayed together with a similar drawing displayed with the existing drawing data, and in a case in which similar existing drawing data is not present, a label of "similarity is not present" is displayed. In a case in which matching existing drawing data and similar existing drawing data are both not present, presence/absence of existing drawing data having the same attribute is determined. In the example of FIG. 3, a set of attributes is determined such that a material is iron, surface treatment is blackening, and a processing method is sheet metal processing, and as order record information of a component having the same attribute in the past, top three companies as ordering destinations are displayed.

FIG. 4 illustrates another example of the order record information according to the first embodiment of the present invention. An order record display screen 400 includes a selection region 401 for selecting any one of a plurality of drawings displayed with a plurality of pieces of drawing data acquired by the device 100, a target drawing display region 402 for displaying a target drawing selected from among the drawings, and an existing drawing display region 403 for displaying one or more existing drawings related to the target drawing. When any one of the drawings displayed in the selection region 401 is selected, the drawing is displayed to be larger in the target drawing display region 402, and details of the drawing can be checked. Regarding any one of the existing drawings related to the target drawing, at least part of the order record information associated with the existing drawing data for displaying the existing drawing may be further displayed in the existing drawing display region 403. In the example of FIG. 4, a price is displayed as the order record information for the top existing drawing. In FIG. 4, a label such as "similarity is present" is not displayed, but the label may be displayed similarly to FIG. 3.

In this way, by determining presence/absence of related existing drawing data for at least part of target drawing data included in a plurality of pieces of drawing data representing a set of components, and in a case in which the related existing drawing data is present, transmitting the order record display information for displaying the order record information that is stored while being associated with the existing drawing data, a viewer of the order record information such as a purchasing agent of a manufacturer can easily visually grasp a valid candidate for an outsourcing contractor for manufacturing for each of the components.

If the order record information includes a price or a unit price, the viewer can easily grasp a proper standard of price negotiation with the outsourcing contractor.

In a case in which related existing drawing data is not present, by displaying the order record information stored for the component having the same attribute based on the attribute determined from each piece of the drawing data as needed, a wider range of candidates for the outsourcing contractor for manufacturing can be grasped.

In the above description, exemplified is a case of using a feature amount extracted from each piece of the drawing data in determining presence/absence of related existing drawing data for a certain piece of drawing data. Alternatively, a cell structure of a title space associated with a user may be referred to, and characters extracted from data for displaying the title space included in the drawing data may be additionally or alternatively used. More typically, an attribute that is determined based on characters or symbols extracted by performing character recognition or symbol recognition on the drawing data may be additionally or alternatively used. Additionally, a condition may be received from the fabricator terminal 120, and the fact that the condition matches the order record information such as an ordering destination or a price may be additionally used in the determination described above. It can be considered that a matching degree or similarity obtained from multiple analysis processes is added as a point to determine drawing data having the highest score to be matching drawing data, or the score is compared with one or more thresholds to determine data to be matching drawing data or similar drawing data. The matching degree or similarity may be calculated by using an estimation model generated by machine learning.

In the above description, the processing method is determined based on characters or symbols extracted by character recognition or symbol recognition on the drawing data. Alternatively, it may be determined whether special processing determined in advance is required, and a result of the determination may be used for determining presence/absence of related existing drawing data, or used for specifying a component having the same attribute. By way of example, a degree of difficulty in processing a cam mechanism is high, and the number of fabricators who can process the cam mechanism is not necessarily large. Thus, if it is found that the component represented by the drawing data requires processing of a cam mechanism, a candidate for an outsourcing contractor for manufacturing can be effectively narrowed down. In bending processing, a degree of difficulty is high in bending at a height equal to or lower than four times a thickness, and a degree of difficulty is also high in processing of finishing a component made of aluminum as a material with no damage. There are many kinds of special processing in manufacturing industry, and the device 100 may perform detection processing for predetermined processing determined in advance on the drawing data. Examples of the predetermined processing include the processing of a cam mechanism described above, bending processing with a ratio of a height to a thickness is smaller than or equal to or smaller than a predetermined value, processing of aluminum with no damage, and processing of a gear.

In the above description, in a case in which the first existing drawing data related to the target drawing data is not present, the second record information is acquired, the second record information associated with the second existing drawing data representing the component having the same attribute as that of the component represented by the target drawing data. Alternatively, the second record information may be acquired in addition to the first record information in a case in which the first existing drawing data is present, or only the second record information may be acquired regardless of presence/absence of the first existing drawing data.

In FIG. 2, "start" and "end" are merely examples, and do not mean that the processing in the method according to the present embodiment is necessarily started at S201 and necessarily ended at S206.

Second Embodiment

The first embodiment describes an example of supporting outsourcing of manufacturing by the manufacturer. The present embodiment describes an example of supporting contract for manufacturing accepted by the fabricator.

The method according to the present embodiment is similar to the method according to the first embodiment, but is different therefrom in that the record information acquired by the device 100 is order receipt record information instead of the order record information, and the information transmitted to the fabricator terminal 120 from the device is order receipt record display information instead of the order record display information.

When the fabricator presents an estimated amount in response to an estimation request, if the fabricator can grasp an order receipt amount or a unit price of order of a component that has been ordered in the past by the manufacturer making an estimation request, it is possible to previously check that the estimated amount to be newly presented is at a proper level. Although it is useful that the drawing data representing the component that has been ordered in the past by a different manufacturer is determined to be related drawing data, it is preferable that related drawing data is determined from the drawing data representing the component that has been ordered in the past by the same manufacturer. The same applies to determination of the drawing data representing the component having the same attribute.

To identify the manufacturer, at the time of storing a plurality of pieces of drawing data representing a set of components transmitted from the fabricator terminal 120, the device 100 preferably also stores a manufacturer identifier for identifying the manufacturer to which manufacturing of the set of components is outsourced. A method for associating the manufacturer identifier with the pieces of drawing data may be any method. By way of example, a fabricator using the fabricator terminal 120 may input the manufacturer identifier on a Web page provided by the device 100.

In addition to a case in which the fabricator directly accepts a contract from the manufacturer, there is a case in which a trading company that accepts a contract from the manufacturer outsources processing to a fabricator as a secondary outsourcing contractor. In this case, an intermediary trader such as a trading company manages drawing data to be presented to the fabricator by itself in addition to the drawing data received from the manufacturer on the drawing management service provided by the device 100. More typically, assuming that the manufacturer identifier described above is an outsourcing trader identifier, the former may be associated with an identifier for identifying the manufacturer, and the latter may be associated with an identifier for identifying itself as the intermediary trader.

In the embodiments described above, it is noted that, unless "only" is used such that "based on only xx", "in accordance with only xx", or "in a case of only xx", additional information may be considered herein. It is also noted that, by way of example, description of "perform b in a case of a" does not necessarily mean "always perform b in a case of a" or "perform b immediately after a" unless explicitly stated. Additionally, description of "each a constituting A" does not necessarily mean that A is constituted of a plurality of constituent elements, but encompasses a case in which a constituent element is single.

By way of precaution, if there is an aspect of performing an operation different from the operation described herein in any method, computer program, terminal, device, server, or system (hereinafter, "method and the like"), the aspects of the present invention are applied to the same operation as any of the operations described herein, and presence of the operation different from the operations described herein does not exclude the method and the like from the scope of the aspects of the present invention.

The embodiment described above exemplifies a case in which a computer on a server side or a client side is implemented by one computer. In contrast, software may be installed in a plurality of computers, and each of the computers may include all or part of the constituent elements according to the embodiment. In this case, a form of distributed computing may be employed such that the computers perform communication processing with each other. Information transmitted from the computer on the client side may be processed by one or more computers on the server side disposed on a cloud. The computer on the server side or the client side described in the embodiment includes each one of the constituent elements, but may include a plurality of the same constituent elements.

Various arithmetic operations executed by the computer in the present embodiment may be executed in parallel processing by using at least one processor or using a plurality of computers via a network. The various arithmetic operations may be distributed to a plurality of arithmetic cores in the processor to be executed in parallel processing. Alternatively, the various arithmetic operations executed by the computer on the server side may be executed by at least one processor and at least one storage device disposed on a cloud capable of communicating with the computer on the client side via a network.

According to an aspect of the present invention, by determining presence/absence of related existing drawing data for at least part of target drawing data included in a plurality of pieces of drawing data representing a set of components, and in a case in which the related existing drawing data is present, transmitting record display information for displaying record information that is stored while being associated with the existing drawing data, a viewer of the record information such as a manufacturer, a fabricator, and an intermediary trader can smoothly outsource manufacturing of each components.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of operation of a computer for managing a plurality of pieces of drawing data representing a set of components, the method comprising:
   determining whether target drawing data included in the plurality of pieces of drawing data is related to existing drawing data that has been already stored;
   acquiring record information when the record information associated with the existing drawing data is stored in a case in which a result of the determining is affirmative; and
   transmitting record display information for displaying the record information to a terminal,
   wherein the determining includes determining whether the existing drawing data represents a component having an attribute identical with an attribute of a component represented by the target drawing data, the attribute representing a combination of two or more of a material, a surface treatment, and a processing method.

2. The method according to claim 1, wherein the attribute is extracted by performing character recognition or symbol recognition on the target drawing.

3. The method according to claim 1, wherein the determining is performed by using a feature amount that is extracted by vectorizing each of the target drawing data and the existing drawing data.

4. The method according to claim 3, wherein the feature amount is a frequency distribution or an angle distribution of a plurality of line segments included in the vectorized drawing data.

5. The method according to claim 1, wherein the record display information includes the existing drawing data, and a price or a unit price and an attribute of a component represented by the existing drawing data.

6. The method according to claim 1, wherein
   the record information is order receipt record information, and
   the determining includes determining whether the existing drawing data represents a component that has been ordered in past by a same manufacturer of a component represented by the target drawing data.

7. A non-transitory computer-readable medium on which programmed instructions are stored, wherein the programmed instructions, when executed by a computer, causes the computer to perform a method for managing a plurality of pieces of drawing data representing a set of components, the method comprising:
   determining whether target drawing data included in the plurality of pieces of drawing data is related to existing drawing data that has been already stored;
   acquiring record information when the record information associated with the existing drawing data is stored in a case in which a result of the determining is affirmative; and
   transmitting record display information for displaying the record information to a terminal,
   wherein the determining includes determining whether the existing drawing data represents a component having an attribute identical with an attribute of a component represented by the target drawing data, the attribute representing a combination of two or more of a material, a surface treatment, and a processing method.

8. A device for managing a plurality of pieces of drawing data representing a set of components, the device configured to:
   determine whether target drawing data included in the plurality of pieces of drawing data is related to existing drawing data that has been already stored;
   acquire record information when the record information associated with the existing drawing data is stored in a case in which a result of the determining is affirmative; and
   transmit record display information for displaying the record information to a terminal,
   wherein the determining includes determining whether the existing drawing data represents a component having an attribute identical with an attribute of a component represented by the target drawing data, the attribute representing a combination of two or more of a material, a surface treatment, and a processing method.

* * * * *